(12) United States Patent
Yu et al.

(10) Patent No.: US 8,616,745 B2
(45) Date of Patent: Dec. 31, 2013

(54) ELECTRONIC DEVICE FOR POSITIONING LIGHT GUIDING ELEMENT

(75) Inventors: Yong-Jun Yu, Shenzhen (CN);
Xue-Feng Wan, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/593,533

(22) Filed: Aug. 24, 2012

(65) Prior Publication Data

US 2013/0279193 A1      Oct. 24, 2013

(30) Foreign Application Priority Data

Apr. 20, 2012   (CN) .......................... 2012 1 0117556

(51) Int. Cl.
*F21V 7/04*   (2006.01)
(52) U.S. Cl.
USPC .......................................... 362/551; 362/555
(58) Field of Classification Search
USPC ............. 362/3.12, 23.07, 581, 455, 555, 551, 362/23.17, 23.18, 23.19, 632, 633, 634; 439/490

See application file for complete search history.

(56) References Cited

U.S. PATENT DOCUMENTS

| 7,915,552 B2* | 3/2011 | Kim .............................. 200/310 |
| 8,425,079 B2* | 4/2013 | Shiroishi et al. .............. 362/241 |
| 8,545,074 B2* | 10/2013 | Qiu et al. ...................... 362/551 |
| 2013/0242474 A1* | 9/2013 | Zhao et al. ............... 361/679.01 |

* cited by examiner

*Primary Examiner* — David J Makiya
*Assistant Examiner* — James Ellias
(74) *Attorney, Agent, or Firm* — Altis Law Group, Inc.

(57) ABSTRACT

The electronic device includes a first cover, a second cover, a light guiding element, and a PCB. A first blocking rib is formed on a bottom of the first cover. A retaining panel extends from the bottom and includes a hook at a distal end thereof. The second cover includes a second blocking rib. The PCB is positioned between the two covers. A light source is mounted on the PCB. A light guiding element includes a flat panel and two sidewalls extending from the flat panel. The hook engages with the end surface of the first sidewall. The first blocking rib and the retaining panel abut against opposite sides of the light guiding element. The second blocking rib abuts against the end surface of the second sidewall. The light guiding element is coupled to the light source and configured to transmit the light from the light source.

7 Claims, 6 Drawing Sheets

ELECTRONIC DEVICE FOR POSITIONING LIGHT GUIDING ELEMENT

BACKGROUND

1. Technical Field

The disclosure relates to electronic devices and, more particularly, to an electronic device for positioning a light guiding element.

2. Description of Related Art

In conventional Digital video disk (DVD), a LED lens is positioned in the DVD via two points of heat melting. However, a cost of heat melting is high.

Therefore, what is needed is an electronic device for positioning a light guiding element to overcome the described shortcoming.

DETAILED DESCRIPTION

Figure 1:
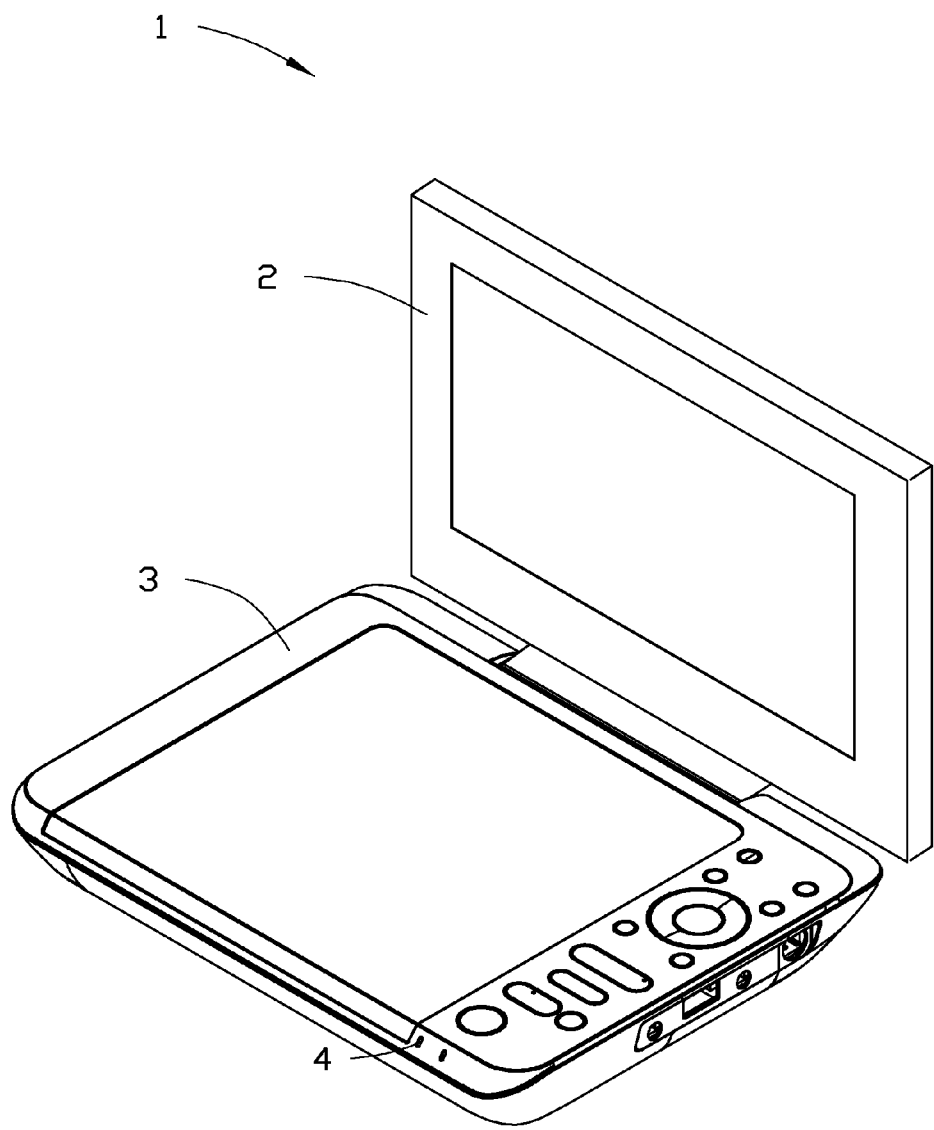
FIG. 1 is a schematic view of an electronic device for positioning a light guiding element in accordance with an exemplary embodiment.

Referring to FIG. 1, an electronic device 1 for positioning a light guiding element (hereinafter "the electronic device") is illustrated. The electronic device 1 may be a mobile phone, a media player, or a DVD. A DVD 1 is described as an example in the embodiment. The DVD 1 includes a screen 2 and a body 3. At least one through hole 4 is formed in a corner of the body 3.

Figure 2:
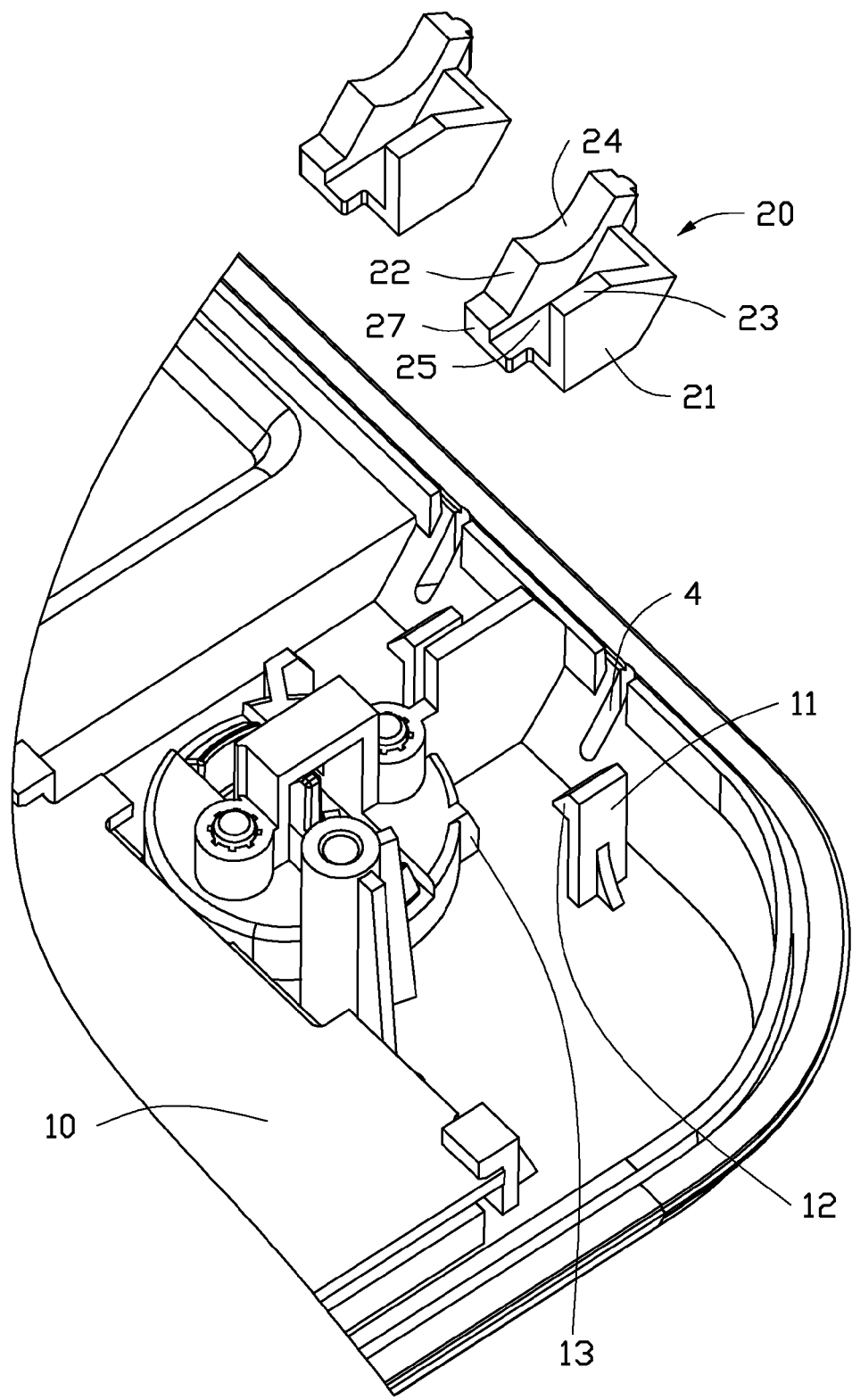
FIG. 2 is a perspective view of a first cover and a light guiding element of the electronic device of FIG. 1.
Figure 3:
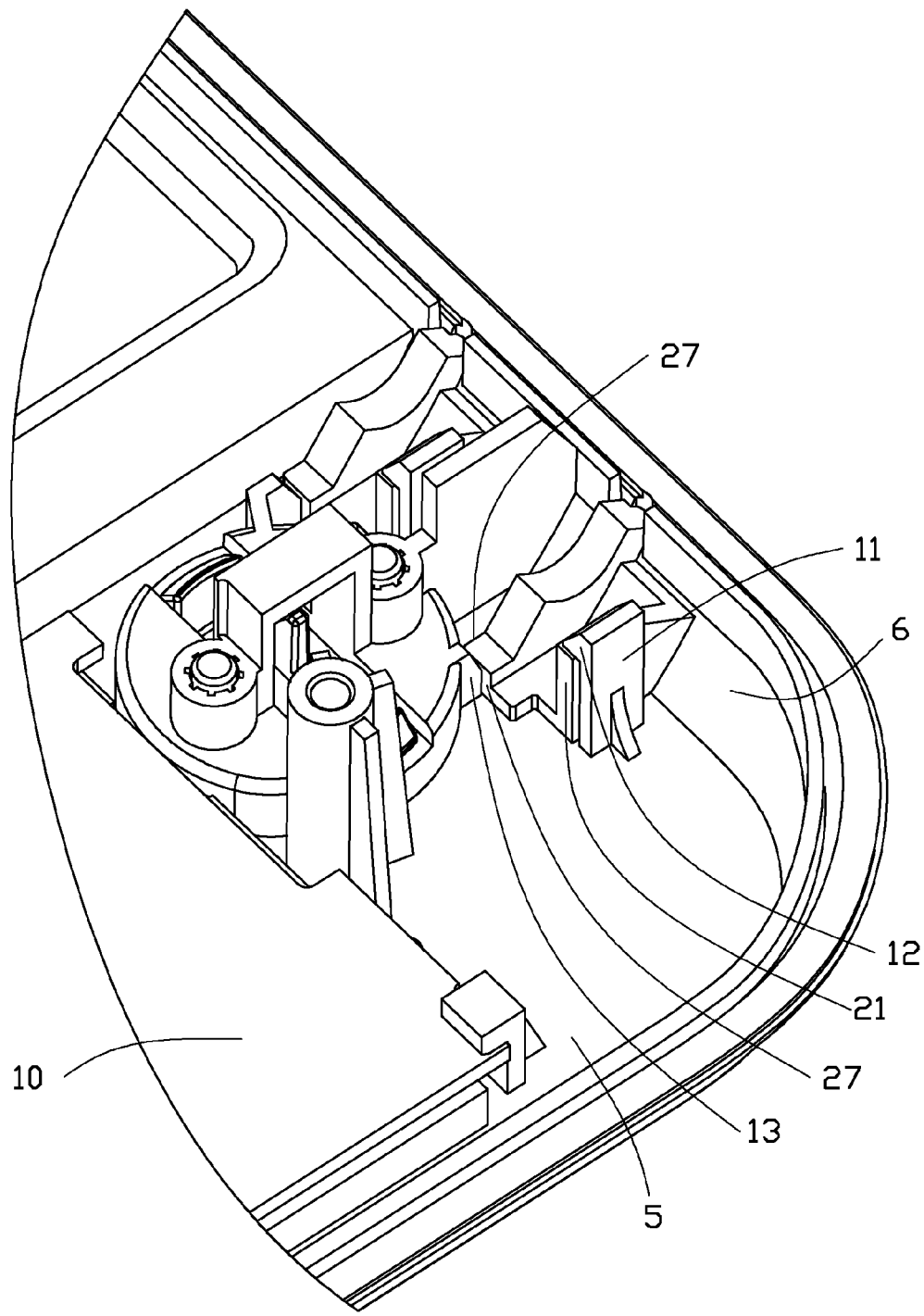
FIG. 3 is similar to FIG. 2 but the first cover engaged with a light guiding element.
Figure 4:
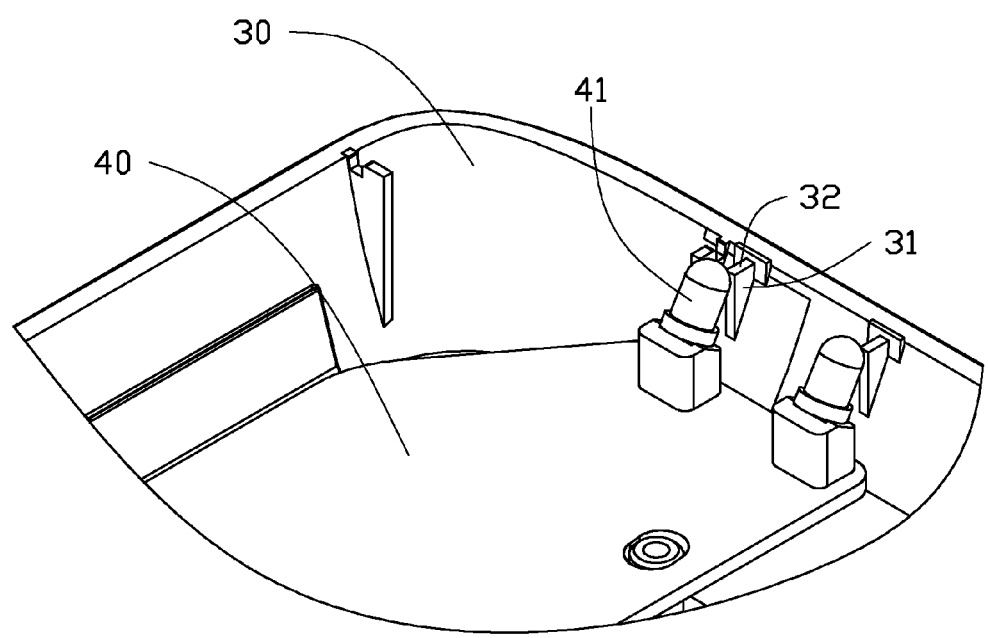
FIG. 4 is a perspective view of a second cover and a light source of the electronic device of FIG. 1.

Referring to FIGS. 2-4, the body 3 includes an upper cover 10, a bottom cover 30, a light guiding element 20, and a printed circuit board (PCB) 40. The upper cover 10 includes a bottom 5 and a cover sidewall 6. The cover sidewall 6 extends from the bottom 5. A first blocking rib 13 is formed on the bottom 5. A retaining panel 11 extends from the bottom 5 and is spaced from the first blocking rib 13. The retaining panel 11 includes a hook 12 at a distal end thereof. Both the first blocking rib 13 and the retaining panel 11 are fixed on the upper cover 10. In the embodiment, the first blocking rib 13 and the retaining panel 11 are aligned in parallel with each other.

The bottom cover 30 includes a second blocking rib 31. The second blocking rib 31 is formed on the bottom cover 30. The top of the second blocking rib 31 is a flat surface 32. The upper cover 10 and the bottom cover 30 are engaged with each other to form an accommodating space. The PCB 40 is positioned in the accommodating space. A light source 41 is mounted on the PCB 40 and is electrically connected to the PCB 40. When the DVD 1 works, the PCB 40 may control the light source 41 to emit light.

The light guiding element 20 comprises a flat panel 25 and two sidewalls 21, 22 extending from the flat panel 25. The light guiding element 20 is retained between the first blocking rib 13 and the retaining panel 11 attached to the bottom 5. In the embodiment, the two sidewalls 21, 22 are parallel to each other and spaced from each other to form a groove therebetween. The light guiding element 20 is made of semitransparent material, such as Acrylic.

Figure 5:
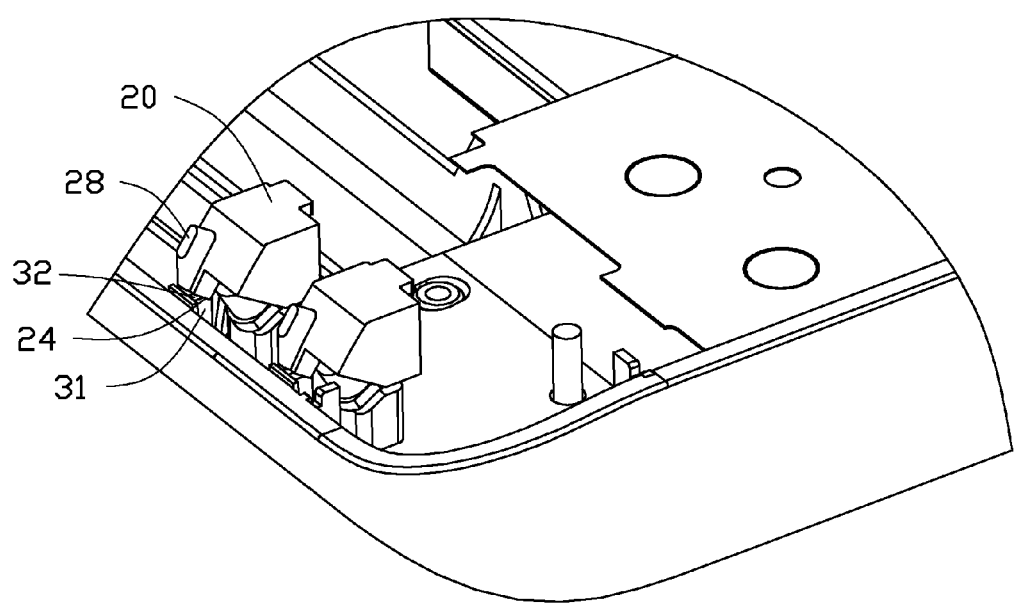
FIG. 5 is a perspective view of a second cover engaged with a light guiding element of the electronic device of FIG. 1.
Figure 6:
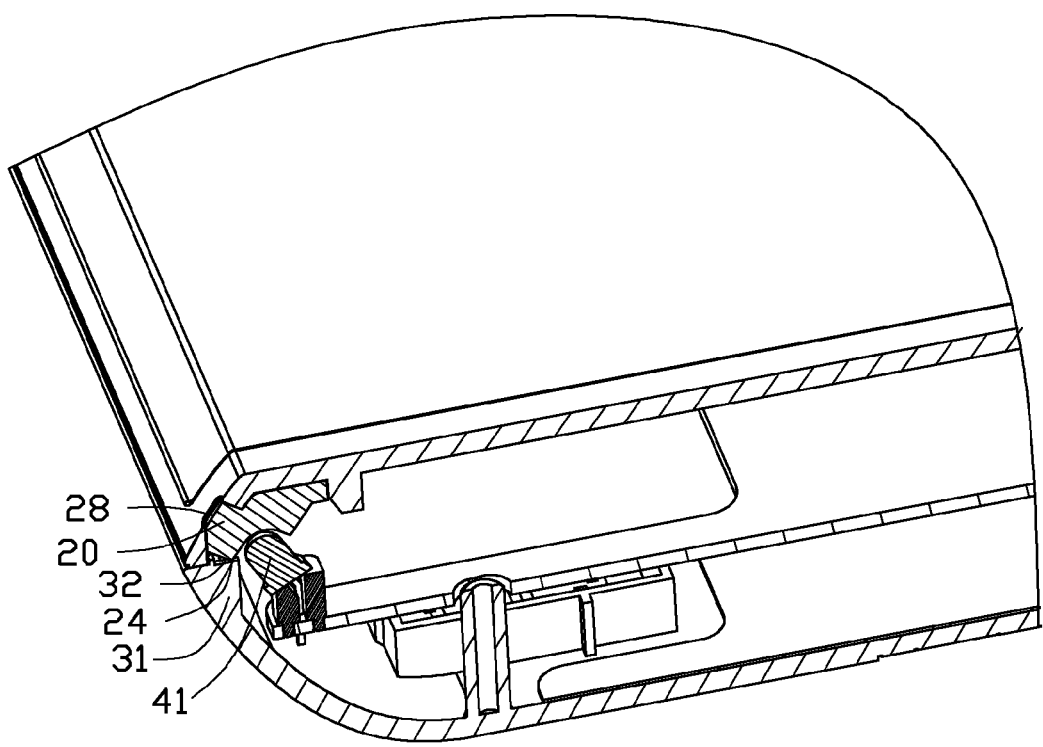
FIG. 6 is a sectional view in an enlarged scale of the electronic device of FIG. 1.

Referring to FIGS. 5-6, the first sidewall 21 includes an end surface 23 facing away from the retaining panel 11, and the hook 12 engages with the end surface 23 of the first sidewall 21 for preventing the light guiding element 20 from moving in a direction away from the bottom 5. The first blocking rib 13 and the retaining panel 11 abuts against opposite sides of the light guiding element 20. The second sidewall 22 includes an end surface 24 facing away from the retaining panel 11, and the second blocking rib 31 abuts against the end surface 24 of the second sidewall 22. The light guiding element 20 is optically coupled to the light source 41 and utilized for transmitting the light emitted from the light source 41.

As shown in FIGS. 1 and 5, further, the through hole 4 is formed on the cover sidewall 6. The light guiding element 20 includes a protrusion 28. The protrusion 28 protrudes from the second sidewall 22 and is inserted in the through hole 4 to guiding the light from the light source 41 to an exterior of the first cover 10.

For a good guide light effect, the second sidewall 22 includes an inwardly curved cutout defined in the end surface 24 thereof. The light source 41 is an LED having a light emitting head portion receivingly engaged in the cutout of the second sidewall 21. Therefore, when the light source 41 emits light, the light guiding element 20 can have a good guide light effect based on the curved structure.

The number of the light guiding element 20 is selected according to user's needs. The number of the light guiding element 20, the through hole 4, the light source 41, the first blocking rib 13, and the second blocking rib 14 are the same. In the embodiment, the number of the light guiding elements 20 is two.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
   a first cover including a bottom;
   a first blocking rib formed on the bottom;
   a retaining panel extending from the bottom and spaced from the first blocking rib, the retaining panel comprising a hook at a distal end thereof;
   a second cover attached to the first cover;
   a second blocking rib formed on the second cover;
   a printed circuit board (PCB) positioned between the first and the second covers;
   a light source mounted on the PCB for emitting light; and
   a light guiding element comprising a flat panel and two sidewalls extending from the flat panel, the light guiding element retained between the first blocking rib and the retaining panel attached to the bottom;
   wherein the first sidewall comprises an end surface facing away from the panel, the hook engages with the end surface of the first sidewall for preventing the light guiding element from moving in a direction away from the bottom, the first blocking rib and the retaining panel abut against opposite sides of the light guiding element, the second sidewall includes an end surface facing away from the panel, the second blocking rib abuts against the end surface of the second sidewall, and the light guiding element is optically coupled to the light source and configured for transmitting the light emitted from the light source.

2. The electronic device as recited in claim 1, wherein the two sidewalls are parallel to each other and spaced from each other to form a groove therebetween.

3. The electronic device as recited in claim 1, wherein the second sidewall comprises an inwardly curved cutout defined in the end surface thereof.

4. The electronic device as recited in claim 3, wherein the light source is an LED having a light emitting head portion receivingly engaged in the cutout of the second sidewall.

5. The electronic device as recited in claim 1, wherein the light guiding element is made of semitransparent material.

6. The electronic device as recited in claim 1, wherein the first cover comprises a cover sidewall extending from the bottom, a through hole is formed on the cover sidewall, and the light guiding element including a protrusion inserted in the through hole to guiding the light from the light source to an exterior of the first cover.

7. The electronic device as recited in claim 6, wherein the protrusion protrudes from the second sidewall.

* * * * *